Feb. 9, 1965   M. M. MERLEN   3,169,164
RETICLE AND MASK COMBINATIONS FOR ELIMINATION
OF CHOPPING OF BACKGROUND RADIATION
Original Filed Dec. 29, 1959   3 Sheets-Sheet 1

MONTY M. MERLEN
INVENTOR.

BY Robert Cure Martin
ATTORNEY

MONTY M. MERLEN
INVENTOR.

BY
ATTORNEY

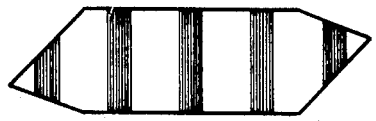
FIG. 9　　　　　　　FIG. 10
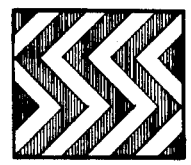
FIG. 11　　　　　　　FIG. 12
FIG. 13　　　　　　　FIG. 14
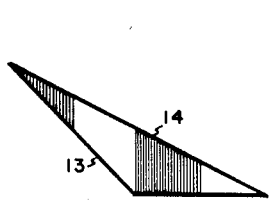
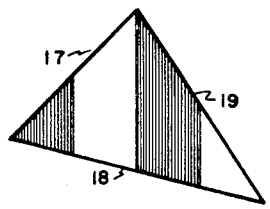
FIG. 15　　　　　　　FIG. 16
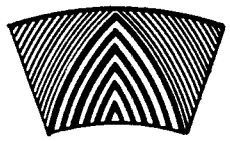
FIG. 17
MONTY M. MERLEN
INVENTOR.
BY Robert Ames Norton
ATTORNEY 3,169,164
RETICLE AND MASK COMBINATIONS FOR ELIMINATION OF CHOPPING OF BACKGROUND RADIATION
Monty M. Merlen, Stamford, Conn., assignor to Barnes Engineering Company, Stamford, Conn., a corporation of Delaware
Continuation of application Ser. No. 862,397, Dec. 29, 1959. This application Dec. 27, 1960, Ser. No. 78,772
9 Claims. (Cl. 88—61)

This is a continuation of my copending application, Serial No. 862,397, filed December 29, 1959, now abandoned.

This invention relates to improved combination of reticle and mask for producing interrupted beams of optical radiation.

A great many devices involve the detection of optical radiation, its transformation into electrical signals and amplification and processing thereof. The term "optical radiation," as used herein, is intended to cover any radiation of sufficiently short wavelength to obey optical laws. The principal forms of such radiation are infrared, visible and ultraviolet. The present invention is particularly important in the field of infrared radiation but is in no sense limited thereto. Except for the nature of materials used in the reticle and in the mask the effect is identical with all types of optical radiation.

When electrical signals from a radiation detector are amplified or otherwise processed electronically it is desirable to produce interrupted beams so that the signal can be processed or amplified by A.C. equipment. This is well known and permits more reliable, accurate and, in many cases, simpler electronic equipment. The problem is well realized and interruption of radiation beams is so commonly used that it may be considered conventional. It is with improvements in reticles and masks for producing such interrupted beams that the present invention deals.

The purpose of a reticle of the type with which this invention deals is to chop the radiation from a desired target. The size of the target is always small and sometimes extremely small compared to the portion of the background which is included in the fields of view defined by the reticle masks. Unless the reticle chops the radiation from the small target without substantial chopping of the background radiation the enormous relative size of the background can result in masking responses to target radiation.

Essentially a reticle may be considered as a moving device successively presenting a pattern of opaque and transparent areas which are moved through the beam usually at predetermined speeds. The simplest type of reticle is a rotating disk, drum or belt with alternating opaque and translucent sections, which in this specification will be referred to by their more common term of bars, without, however, connoting rectangular shapes because, as will be pointed out below, the present invention may employ other shapes of bars. The rotating disk reticle with its rotational center outside the radiation beam is the most common and will be discussed in detail in order to develop the problems which are presented and which are solved by the present invention. What is said there is, of course, equally applicable to drum or belt reticles.

The disk reticle is provided with a series of bars which may be in the form of spokes, straight or curved, which may extend all the way across the face of the reticle or may be broken up into different patterns. In the first case the interruption frequency will be the same regardless of what portion of the reticle intercepts the beam. However, many reticles have been prepared having different sets of bars, for example, the annular zone near the outer periphery may have bars which are quite narrow and other annular zones of wider bars so that different zones of the reticle may produce interruptions at different frequencies.

The ordinary reticle has bars of opaque and transparent or translucent material which are of the same width. In other words, the repetition cycle is one bar opaque and one bar clear. It is perfectly possible and in some cases has been actually used to design reticles in which the cycle may be more than two bars. For example, there might be a broad opaque bar, a narrow clear bar, a narrow opaque bar followed by a wide clear bar. Such a cycle would cover four bars. Cycles with odd numbers of bars are also possible and are useful for certain particular purposes. It is an advantage of the present invention that it is applicable to any reticle cycle and so this term will be used in the broad sense of repeating series of bars regardless of their relative widths or numbers so long as each cycle repeats the same kind of bars in the same order.

Reference has been made above to opaque and clear bars for a single type of radiation. This is by far the most common form of reticle. However, it is perfectly possible to have series of bars of materials of selective transmission, i.e., filters, so that one bar or set of bars may transmit one band of radiation and another bar or set of bars another. In this case there may be interruption of one wavelength at one frequency and another at another. However, if the present invention is to be used the filter bar widths for the different frequencies to be generated must be multiples so that a cycle of pattern repetition for lowest frequency interruption will cover a length of reticle travel which corresponds to a multiple number of cycles of the more closely spaced bars for another wavelength.

Another thing should be borne in mind in connection with the use of the term "bars." This is intended to cover any pattern which is repetitive. In some modifications as will be seen in more specific description the shapes are not rectangles which is the shape usually associated with bars.

Reticles are always used with masks having openings or windows exposing a predetermined cross section of the radiation beam to any one portion of the reticle. This is necessary because without a mask there would be confusion from scattered radiation illumination and also the use of multiple apertures or windows permits a single reticle to interrupt a plurality of beams to produce a plurality of different signals.

For a very large number of instrument types it is desired to measure radiation from a comparatively small target, for example, infrared radiation from a fast flying airplane, infrared or visible radiation from a ship and the like. Radiation detectors are ordinarily small so that the radiation from a relatively small target will occupy but a small portion of the total area of an aperture or window. This is essential for all tracking operations because if the window were of a comparable size of the target, the target would be almost instantly lost from the field of view. This presents a tremendous problem because the radiation from the huge background seen by any one aperture may completely swamp the radiation from a small target. For example, in the case of tracking aircraft either by visible or infrared the sky background may produce a signal of comparable or greater magnitude than that from the target and in the case of accidental viewing of a portion of the sky including the sun the difference is tremendous. The problem, therefore, is to provide means for selecting only target radiations and ignoring all background radiation.

It is apparent and has been realized that A.C. electronic circuits will completely ignore D.C. signals, even though the D.C. signal may be many thousand times greater. This holds if the D.C. signal does not damage or paralyze the A.C. circuits. Therefore, if a reticle and aperture or window cause no interruption of background radiation at the frequency to which the electronic circuits respond the problem would be solved.

It is well known and, if course, might even be considered technical common sense that if the window has sides parallel to rectangular bars and the aperture included an exactly integral number of cycles of bars there would be no interruption of uniform background radiation because the average background radiation through the aperture would remain constant. This approach has been tried and while it is capable of producing some improvement in the reduction of interruption or chopping of the background radiation it runs into a practical stone wall caused by limits of accuracy of reticle and aperture construction. For example, let us assume that it is desired to discriminate against background radiation by a factor of a million, that is to say, that background radiation would have to be one million times as great as that from a tiny target in order to give an equal signal. This requirement is in no way excessive and is a practical requirement for many types of trackers. In such a case the sides of a one inch by one inch aperture and the sides of the bars would have to be exact and parallel to a millionth of an inch. This accuracy is beyond the practical limits for reticles and masks. As a result reticles and masks often have had to be accepted with entirely inadequate reduction of background radiation chopping because this was the best that could be produced in an instrument to be used practically in the field.

The present invention in a cheap, simple method solves the problem from background radiation and permits, with almost ridiculous ease obtaining background radiation rejection up to one part in a million. The present invention depends on a treatment of the two edges of the aperture past which the bars move, or more correctly the zone adjacent to these two edges, so that as the reticle moves into the aperture the rate of increase of area in any annular portion is exactly balanced by a corresponding change on the other edge or zone. The requiremnt is that these edge zones be defined so that their total width is equal to an integral number of cycles.

According to the present invention both aperture edges across which the reticle pattern moves are composed of one or more segments each segment being of a length such that it covers an integral number of cycles of the pattern on the moving reticle. The above requirements connotes that the segments and the pattern edges must meet at an angle otherwise a finite length of aperture edge segment will not extend over a full pattern cycle. This means that if the pattern is of bars with straight edges the aperture edges cannot be straight but must be made up of one or more segments making angles with the direction of travel of the pattern. When the pattern itself is made up of segments of suitable length and angles the sides of the aperture may be straight and at right angles to the direction of travel over the pattern. This is not a requirement with all patterns which are composed of a series of segments but may be considered as a special, but with some patterns, an essential case.

The development of the forms of the present invention can best be approached by way of the relatively simple case where rectangular bars are on a reticle which is in the form of a revolving belt although this is not the most practical design. On a rotating disk reticle the same mathematical relationships will hold and in fact the pattern of such a reticle may be visualized as a series of bars which instead of having parallel edges have constant repetitive angular widths. Another way of looking at the problem is that the relative time taken for the passage of bars is the real criterion and is applicable to either disk reticles or belts. Throughout the remainder of the specification and claims pattern length or width will be used to cover time dimensions. In such cases, and these are the most common, the time angular length of each aperture edge segment bears a definite relation to the angular time width of a reticle pattern cycle. In this invention, the edges of the field defining mask that are perpendicular to the reticle direction of travel are made up of line segments, whose lengths and angles to the reticle's direction of travel are directly a function of and determined by the length of a single reticle cycle. The relation is $$C = \frac{L \cos \alpha}{N}$$

where $C=$ the length of a single reticle cycle.
$L=$ the length of an aperture edge line segment.
$\cos \alpha=$ the absolute value of the cosine function.
$N=$ any positive integer.

This formula denotes that for any fixed values of C and N, the value of $\alpha$ will determine the length L. Also, it should be noted that $\alpha$ can be any one of four different angles between zero and 360° and still satisfy the relationship.

The mathematical equation given above determines the length of each segment, always bearing in mind the other requirement set out previously, namely that there shall be on the opposite aperture edge segments obeying the same mathematical law.

A practical aperture edge may be visualized, therefore, as one having at least one-half saw tooth. The theoretically limiting condition for a complete aperture would be an aperture either in the form of a parallelogram or the form of a trapezoid. Practically there will usually be more than one saw tooth on each edge because in the case of disk reticles the easiest and best construction is a series of saw teeth the height of which varies as one moves from the center out to the periphery of the reticle. Theoretically if straight saw teeth are to be used a very large number of teeth with very small angles will be necessary. However, the correction for background radiation is so good even with rotating disk reticles that practically usable results giving background rejections of one part in a million or better can employ a series of saw teeth of very moderate number. Of course, in the case of a drum or belt reticle the correction would be perfect even with half a tooth but design and operating considerations make these types of reticles less satisfactory for most practical uses.

When there is only a simple pattern passing the aperture, and as long as the two side zones are compensated by the methods of the present invention, it is completely immaterial what the total aperture width is, because in the area between the two edge zones the number of cycles of bars in no way affects the accuracy and in fact it is not necessary that it be an integral number. This advantage is a real one even with stationary masks and also presents a further invention in that the apertures can be varied in width without affecting their accuracy. Thus, for example, if it is desired to have an aperture which is sometimes wide and sometimes narrow the saw tooth edges can be moved toward or away from each other to any degree desired without affecting the accuracy of background radiation rejection. This is something that was entirely impossible with straight edges which were used before because even if the edges were perfectly straight and the aperture included an exact integral number of bars whose edges were also perfectly straight this would hold only for aperture widths where an integral number of cycles were present making continuously variable apertures completely impractical.

When patterns are used on the reticle which are not straight bars the mathematical formula given above will not always be directly applicable. It is applicable with zigzag reticle bars which are parallel. However, the general statement with respect to the segments of the aperture edges applies regardless of the nature of the pattern so long as it is uniformly repetitive.

Another, though not serious, limitation occurs when there are a plurality of patterns of different bar widths passing across the aperture. This is the requirement that the aperture include an integral number of patterns, in other words the aperture edges cannot be moved at will. The precision required is, however, very much less than with staright sided apertures and rectangular bars.

Some complex disk reticles have bars of different angular widths in different parts of the reticle. If the bars are in integral multiple widths, for example, one set twice as wide as the other, and the teeth on the aperture edges are long enough to cover at least one complete cycle of the bars of greatest angular width or more correctly, the cycle of greatest angular width, then these same teeth will produce the same degree of rejection of chopping of background illumination for all of the bar widths or cycle widths. In the hypothetical case set out above the teeth would cover one cycle of the wider bars and two cycles of the narrower ones. This makes it possible to design reticles which interrupt for a predetermined rotational angle or annulus at one frequency and interrupt at a different frequency in other places. Thus, if a reticle is provided with more than one band or cycle width, in an area which would pass under a given aperture, the preferred embodiment of the invention is to have the different cycle widths in integral multiples. The above, however, is not essential to the operation of the invention because if in one annular zone the cycle widths differed from another angular zone all that would be necessary would be to have the right tooth lengths for the edges in each zone. Since, however, it is easier to operate with a single tooth length or with a single variation of tooth length, and it is just as easy normally to have the angular widths of bar cycles in integral multiples, it is normally unnecessary to depart from the preferred embodiment even though the invention can be modified to operate with other angular cycle widths.

The invention will be described in greater detail in conjunction with the drawings in which:

FIGS. 4 to 17 represent different reticle patterns and different apertures.

Figure 1:
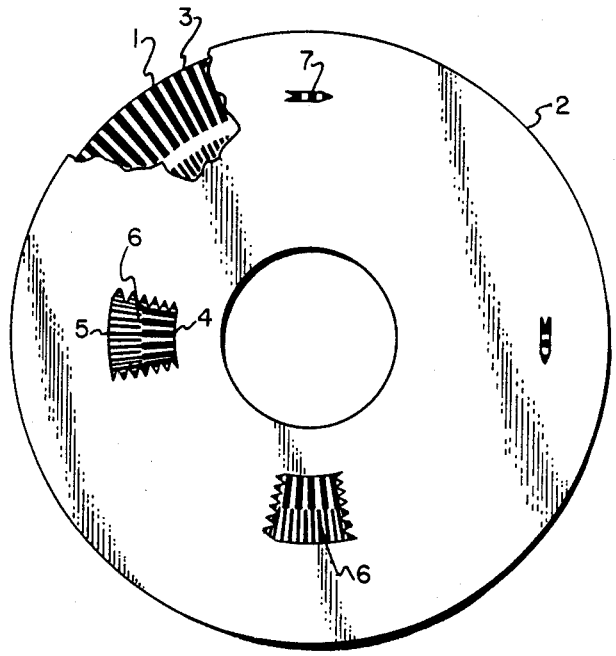
FIG. 1 is a plan view (partly broken away) of a disk reticle with a plurality of apertures and patterns.

FIG. 1 represents a reticle and mask of the disk type provided with four openings and three different patterns of rectangular bars. This reticle is useful in trackers requiring wide field acquisition and narrow field fine tracking. Such a tracker is described and claimed in the United States Patent 2,961,545, November 22, 1960, to Robert W. Astheimer and Monty M. Merlen, filed October 23, 1959. The tracker forms no part of the present invention and represents only one field of utility for the reticles and masks of the present invention.

The reticle in the form of a rotatable disk 1 is shown with three patterns of bars, one pattern extending around the periphery and composed of bars of medium angular width designated by 3 and two other patterns 4 and 5 of wide bars and narrow bars respectively. The reticle is provided with two wide acquisition apertures 6 and two narrow fine tracking apertures 7. The apertures 6 are provided with saw teeth the individual teeth covering a full cycle of the wide bars and two cycles of the narrow bars. The small aperture 7 past which the bars 3 move provides a single tooth and notch, each covering one cycle.

In accordance with the principles of the present invention which have been set out above, uniform background radiation through the whole of any one of the four apertures is not chopped as the teeth are of a length and an angle with respect to the bars such that they obey the formula $$C = \frac{L \cos \alpha}{N}$$

Accordingly the spacing of the edges of the aperture is immaterial. It will be noted that in the larger apertures 6 the saw teeth are not of uniform length because the bars are radial. The teeth nearer the center of the disk are, therefore, shorter whereas those nearer the outer periphery are longer. In terms of the time dimensions of the bars or more properly cycles, the teeth are, of course, uniform.

Figure 2:
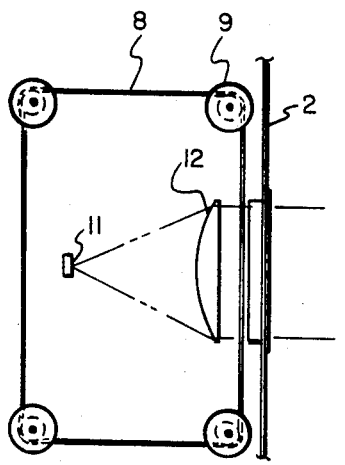
FIG. 2 is a section through a belt reticle.
Figure 3:
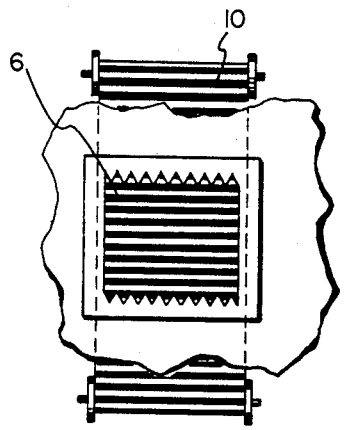
FIG. 3 is a plan view (partly broken away) of the belt reticle of FIG. 2.

FIGS. 2 and 3 illustrate a belt reticle. Similar parts bear the same reference numerals as FIG. 1. The belt reticle comprises a mask 2 with an aperture 6 provided with uniform saw teeth on its edges. The reticle itself is in the form of a moving belt 8 which passes around four rollers 9 and is provided with uniform clear and opaque rectangular bars 10 forming a repetitive cycle of two bars. Light passing through the aperture is imaged on a detector 11 by means of a lens 12. Since the bars on the belt are parallel and rectangular the teeth on the edges of the aperture may be uniform and are so shown, each tooth covering a single pattern cycle. As pointed out above the size of the aperture is immaterial and does not have to include an integral number of cycles.

FIGS. 4 to 17 illustrate a number of mask apertures and reticle pattern configurations. For simplicity of illustration the bars are shown parallel except in FIGS. 12 to 14 and so may be considered as illustrating the situation with a belt reticle such as is described in FIGS. 2 and 3 or if the width of the bar be considered as time width the illustrations are applicable also to disk reticles which as pointed out above are the most common types and have the largest number of practical applications.

Figure 4:

FIG. 4 illustrates the simplest case of a parallelogram. The aperture edges 13 and 14 are sides of the parallelogram and as illustrated each side covers a single cycle. The mathematical expression which has been referred to above is immediately apparent. The left hand angle is $\alpha$, the length of the side 13 is $L$ and the width of a cycle, that is to say one opaque bar and one clear bar, is equal to $C$. FIG. 4 illustrates also in dotted lines that the edges may be moved and the aperture as a whole need not enclose an integral number of pattern cycles.

The simple parallelogram might be considered as an aperture with half a saw tooth on either edge. Though basic to one type of aperture edge, this simple form is ordinarily not suitable with disk reticles, at least those in which there is a considerable radial width of aperture. In such a case the sides 13 and 14 would have to be curved which is not a practical design. It might be noted the aperture 7 of FIG. 1 constitutes two parallelograms, or putting it another way, apertures having one whole tooth on one edge.

Figure 5:

The apertures shown in FIGS. 1, 3 and 4 have parallel edges and this basis of development, from the fundamental parallelogram, presents many advantages. However, it is in no sense necessary that the teeth at one edge correspond with similar notches or teeth on the other edge. On the contrary the apex of a tooth may be opposite the apex of another tooth. In the simplest instance, which is represented in FIG. 5, the aperture is in the form of a trapezoid. However, here, as in most other patterns, the mathematical expression $$C = \frac{L \cos \alpha}{N}$$

still holds. As in the case of FIG. 4 the edges may be moved so long as the above relationship holds.

Figure 6:
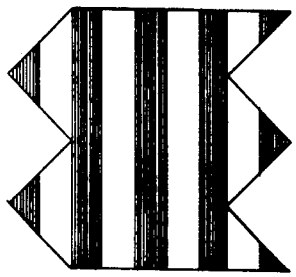
Figure 7:
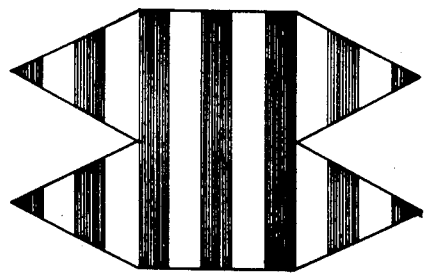

When more than one of the simple figures is present the same advantages are obtained, and FIGS. 6 and 7 illustrate such constructions based on the simple parallelogram and trapezoid respectively.

Figure 8:
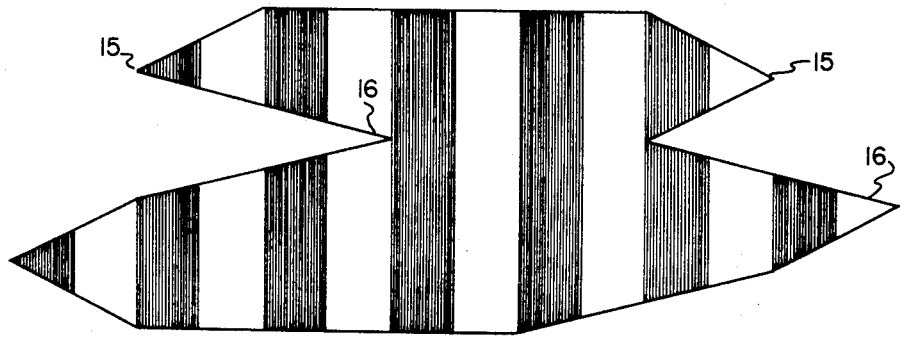

It is not necessary that the individual line segments be of equal length so long as the fundamental requirement that each segment covers an integral number of pattern cycles is met and so long as the second requirement of corresponding segments on the opposite edge is also met. FIG. 8 illustrates such a composite situation, some of the segments represented by 15 being shorter than others represented by 16. This complex aperture is partly trapezoid and partly parallelogram derived as will be immediately apparent by considering its geometry. Correction is just as perfect as with simpler and more uniform designs.

FIG. 9 illustrates a trapezoidally generated aperture in which the bar widths in the reticle pattern are not equal. In this case the clear intervals are much broader than the opaque intervals. Elimination of background chopping, however, is just as complete. In the cases where the segments are not of uniform length the angles may be different for the different segments.

FIGS. 1 and 3 to 9 illustrate reticle patterns having only two kinds of bars, transparent and opaque. This is by no means necessary and FIG. 10 illustrates a situation where the bars in the pattern are provided with filters of different wavelength passage. For simplicity FIG. 10 is shown for a visible light reticle with the filters in each cycle of the pattern from left to right transparent, red, green and blue respectively. In this pattern the bars are of equal width and the cycle is composed of four bars. The aperture edges are derived from two parallelograms as the case in aperture 7, of FIG. 1. The edges may be moved and the whole aperture need not include an integral number of pattern cycles. This is illustrated in FIG. 10 where in fact the aperture width includes slightly more than two cycles.

It is not necessary that the pattern be of a single uniform cycle design and patterns with multiple cycles are also useful in the present invention. Such a situation is shown in FIG. 11 where there are two types of cycle in a pattern, one of three alternating broad, clear and opaque bars followed by three alternating narrow, clear and opaque bars. The segments of the edges are parallelogram derived but as is pointed out above the edges cannot be moved since the pattern is not composed of a single cycle form.

It is by no means necessary that the bars be relatively straight. On the contrary the edges may be straight and the bars may be in segments. A simple case with a two bar pattern of zigzag bars combined with straight aperture edges is shown in FIG. 12. The zigzag of the bars is parallel derived and the mathematical formula still applies though here, of course, the angle refers to the angle of the reticle bars and not to the angle of the aperture edge segments.

The bars may zigzag in opposite directions which is somewhat analogous to trapezoidally derived edge segments. Such an aperture is shown in FIG. 13. However, here the mathematical formula for its segment length does not hold in quite the same obvious way as it does for the apertures of FIGS. 1, 3, 2 and 12.

The foregoing figures have shown cases where either the edge of the aperture or the bars have straight sides. This is by no means necessary. They can both be inclined as is illustrated in FIG. 14 where the bars are parallelogram oriented as are the aperture edges.

It will be noted that in the foregoing figures there are two edges which are in the direction of the reticle pattern travel. These edges are straight in FIGS. 2 to 14 and curve concentrically with the center of the reticle disk in FIG. 1. It is by no means necessary that there be two edges in the direction of travel. It is quite possible to have triangular masks. These are illustrated in FIGS. 15 and 16. In the former there is one edge along the direction of pattern travel, an entering segment 13 and an exit segment 14. The background elimination is still the same and the cosine law is followed.

In this case one of them extends over two cycles and the other only over one. However, in each case there is a same proportion of each pattern bar entering and also leaving. The rate of change with respect to pattern composition is therefore zero and so as in the simpler figures preceding there is no net change in the relative amounts of each kind of bar in the aperture and a uniform background which illuminates the whole aperture is, therefore, not chopped.

FIG. 16 illustrates the situation where there is no edge in the direction of reticle pattern travel. In such a case since three segments are a minimum number which will enclose an area at least one of the edges has to have more than one segment. In FIG. 16 the entering edge is shown with segments 17 and 18 and the exit edge with 19. In this figure each segment extends over an integral number of pattern cycles although the angles which the segments make with the pattern travel are all different.

Reference has been made to the fact that the bars need not have straight edges. This is shown in FIG. 17 which is taken from a disk reticle with a double pattern made up of two triangles with curved bars, each with its own bar width. They are, however, multiples. The entering edge which is not curved but is inclined to the bars extends over an integral number of pattern cycles of each kind and again the background elimination results. The complex reticle with interlocking triangles of different patterns is illustrated as a further example of the background elimination of the present invention. Such a reticle pattern as such is, however, not claimed in the present application as it forms the subject matter of my copending application, Serial No. 16,290, filed March 21, 1960, now Patent No. 3,007,053.

The invention is in no sense limited to the particular aperture edge designs shown in the foregoing figures which are intended only to be illustrative of typical configurations. In general any configuration which meets the requirements of the invention may be used and this great design latitude is an important practical advantage of the invention.

I claim:

1. A movable reticle and mask combination comprising in combination,
   (a) a reticle having a repetitive pattern of components of discrete and varied transmitting and opaque character for a predetermined wavelength range of optical radiation, the pattern having a predetermined pattern cycle length,
   (b) a mask having at least one aperture window therein, the window having at least one pair of edges across which the pattern moves,
   (c) each edge of the pair consisting of at least one segment oblique to the components of the reticle pattern as they move across the edge,
   (d) all of the segments being of finite length and oblique to the pattern components, each segment making an angle with the pattern travel direction that is substantially the same at all points along the segment, and each segment having a length covering an integral number of pattern cycles, whereby total radiation from a uniform background through the aperture window does not change and, therefore, a uniform background is not chopped by the reticle.

2. A reticle and mask combination according to claim 1 in which in addition to the pair of edges across which the pattern moves the window has at least one edge in the direction of pattern movement.

3. A reticle and mask combination according to claim 2 in which each edge across which the pattern moves is composed of a plurality of segments.

4. A reticle and mask combination according to claim 2 in which the aperture window sides are straight lines at right angles to the direction of pattern travel and the pattern consists of segmented bars.

5. A reticle mask pattern according to claim 4 in which the bars are respectively parallel to each other.

6. A reticle mask combination according to claim 4 in which both the aperture edges and the bars are inclined to the direction of travel of the reticle pattern.

7. A reticle mask combination according to claim 1 in which the length of each segment corresponds to the mathematical relationship $$C = \frac{L \cos \alpha}{N}$$

where N is a positive integer, C is the length of a cycle pattern, L is the length of the segment and $\alpha$ is the angle the segment makes with the direction of reticle pattern movement, and cos $\alpha$ is the absolute numerical value of the cosine function of $\alpha$.

8. A reticle mask combination according to claim 1 in which the reticle is a rotatable disk reticle and the segment length and pattern cycle length are in time or angular measure.

9. A reticle pattern combination according to claim 8 in which the aperture edge segments follow the mathematical relation $$C = \frac{L \cos \alpha}{N}$$

in which N is a positive integer, C and L are the lengths of cycle pattern and segments respectively and $\alpha$ is the angle the segment makes with the direction of travel of the pattern as the reticle moves, and cos $\alpha$ is the absolute numerical value of the cosine function of $\alpha$.

References Cited in the file of this patent

UNITED STATES PATENTS

| | | |
|---|---|---|
| 2,016,036 | FitzGerald | Oct. 1, 1935 |
| 2,772,479 | Doyle | Dec. 4, 1956 |
| 2,949,672 | Ostergren | Aug. 23, 1960 |
| 3,024,699 | Chitayet | Mar. 13, 1962 |